(12) United States Patent
Lim et al.

(10) Patent No.: US 8,704,958 B2
(45) Date of Patent: Apr. 22, 2014

(54) IMAGE DISPLAY DEVICE AND OPERATION METHOD THEREOF

(75) Inventors: Young Wan Lim, Seoul (KR); Gyu Seung Kim, Seoul (KR); Jae kyung Lee, Seoul (KR); Si Jin Kim, Seoul (KR); Kun Sik Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 667 days.

(21) Appl. No.: 12/647,231

(22) Filed: Dec. 24, 2009

(65) Prior Publication Data

US 2010/0302461 A1  Dec. 2, 2010

(30) Foreign Application Priority Data

Jun. 1, 2009 (KR) .................. 10-2009-0048228
Jun. 12, 2009 (KR) .................. 10-2009-0052283

(51) Int. Cl.
*H04N 5/44* (2011.01)

(52) U.S. Cl.
USPC .................. 348/734; 340/12.22; 340/5.8

(58) Field of Classification Search
USPC .................. 348/734, 569, 552; 345/158;
340/825.22, 12.11–12.3, 5, 8, 81, 85,
340/4.31, 3, 71; 455/420, 41.1, 41.2
See application file for complete search history.

(56) References Cited

U.S. PATENT DOCUMENTS

| | | | |
|---|---|---|---|
| 5,500,691 A | 3/1996 | Martin et al. .................. 348/734 |
| 5,545,857 A | 8/1996 | Lee et al. | |
| 6,407,779 B1 | 6/2002 | Herz | |
| 6,812,881 B1* | 11/2004 | Mullaly et al. ................ 341/176 |
| 7,747,077 B2 | 6/2010 | Murakami | |
| 7,769,370 B2* | 8/2010 | Du Breuil et al. ............ 455/420 |
| 8,259,103 B2 | 9/2012 | Glueck et al. | |
| 2002/0113896 A1 | 8/2002 | Takagi et al. ................ 348/569 |
| 2003/0142139 A1 | 7/2003 | Brown et al. | |
| 2004/0104891 A1 | 6/2004 | Sacca et al. ................... 345/156 |
| 2005/0105951 A1 | 5/2005 | Risheq | |
| 2005/0151886 A1* | 7/2005 | Hirano ......................... 348/734 |
| 2005/0275637 A1 | 12/2005 | Hinckley et al. | |
| 2006/0035590 A1 | 2/2006 | Morris et al. | |
| 2006/0181430 A1 | 8/2006 | Choi et al. | |
| 2006/0184966 A1 | 8/2006 | Hunleth et al. | |
| 2006/0206835 A1 | 9/2006 | Chaudhri et al. ............ 715/781 |

(Continued)

FOREIGN PATENT DOCUMENTS

| | | |
|---|---|---|
| CN | 101341457 | 1/2009 |
| JP | 10-083272 | 3/1998 |

(Continued)

OTHER PUBLICATIONS

Office Action dated Mar. 15, 2012 for U.S. Appl. No. 12/618,639.

(Continued)

*Primary Examiner* — Michael Lee
(74) *Attorney, Agent, or Firm* — KED & Associates LLP

(57) ABSTRACT

An image display device and method may be provided for pairing with a remote control device for transmitting a command to the image display device. Upon power-on, the image display device may be paired with the remote control device. When the image display device is power-on, a guide screen may be displayed to indicate how to pair the image display device with the remote control device. A user may easily pair the remote control device with the image display device through the pairing guide screen.

6 Claims, 16 Drawing Sheets

(56) References Cited

U.S. PATENT DOCUMENTS

| | | | |
|---|---|---|---|
| 2006/0214924 A1 | 9/2006 | Kawamoto et al. | 345/173 |
| 2007/0019771 A1 | 1/2007 | Ambuehl et al. | |
| 2007/0067798 A1 | 3/2007 | Wroblewski | |
| 2007/0083825 A1 | 4/2007 | Chaudhri et al. | |
| 2007/0245256 A1 | 10/2007 | Boss et al. | |
| 2008/0024682 A1 | 1/2008 | Chen | |
| 2008/0150964 A1 | 6/2008 | Cho | 345/629 |
| 2008/0157993 A1 | 7/2008 | Du Breuil et al. | |
| 2008/0248748 A1 | 10/2008 | Sangster et al. | |
| 2008/0253772 A1 | 10/2008 | Katsuyama | 398/106 |
| 2009/0045970 A1* | 2/2009 | Miyabayashi et al. | 340/825.22 |
| 2009/0089668 A1 | 4/2009 | Magnani et al. | 715/273 |
| 2009/0150224 A1 | 6/2009 | Lu et al. | |
| 2009/0257379 A1 | 10/2009 | Robinson et al. | |
| 2010/0081506 A1 | 4/2010 | Yoshikawa et al. | |
| 2010/0083313 A1 | 4/2010 | White et al. | |
| 2010/0123834 A1* | 5/2010 | Brodersen et al. | 348/734 |
| 2010/0181990 A1 | 7/2010 | Hudson et al. | 324/115 |
| 2010/0305999 A1 | 12/2010 | Fujioka | |
| 2010/0319024 A1 | 12/2010 | Hiraoka | |

FOREIGN PATENT DOCUMENTS

| | | |
|---|---|---|
| KR | 10-2008-0010859 | 1/2008 |
| WO | WO 95/05709 | 2/1995 |
| WO | WO 00/59212 | 10/2000 |
| WO | WO 02/34345 | 5/2002 |
| WO | WO 2006/088831 | 8/2006 |
| WO | WO 2007/060638 | 5/2007 |
| WO | WO 2008/038883 | 4/2008 |
| WO | WO 2008/084696 | 7/2008 |
| WO | WO 2008/156453 | 12/2008 |
| WO | WO 2009/032998 | 3/2009 |

OTHER PUBLICATIONS

European Search Report dated May 3, 2010.
European Search Report dated May 20, 2010.
Ryan W. Woodings et al., "Rapid Heterogeneous Ad Hoc Connection Establishment: Accelerating Bluetooth Inquiry Using IrDA;"Wireless Communications and Networking Conference 2002; WCNC2002. 2002 IEEE, vol. 1, Mar. 17, 2002, pp. 342-349.
European Search Report dated May 7, 2010.
Sung-Jung Cho et al.; "Magic Wand: A Hand-Drawn Gesture Input Device in 3-D Space with Inertial Sensors;" Proceedings of the $9^{th}$ Int'l Workshop on Frontiers in Handwriting Recognition (WFHR—Sep. 2004).
Chinese Office Action dated Sep. 15, 2011 for Application 200910265992.X and English language translation.
European Search Report for Application 10151466.9 dated May 6, 2010.
European Search Report for Application 10163855.9 dated Sep. 9, 2010.
Chinese Office Action dated Dec. 7, 2011 for Application 200910265989.8.
Office Action dated Dec. 28, 2011 for U.S. Appl. No. 12/647,226.
Office Action dated Dec. 29, 2011 for U.S. Appl. No. 12/647,222.
Office Action dated Jun. 18, 2012 for U.S. Appl. No. 12/647,226.
Office Action dated Jul. 17, 2012 for U.S. Appl. No. 12/618,639.
Office Action dated Oct. 9, 2012 for U.S. Appl. No. 12/783,970.
Office Action dated Nov. 19, 2012 for U.S. Appl. No. 12/686,150.
Office Action dated Dec. 13, 2012 for U.S. Appl. No. 12/618,639.
U.S. Office Action dated Mar. 8, 2013 for U.S. Appl. No. 12/647,222.
Final U.S. Office Action dated Mar. 22, 2013 for U.S. Appl. No. 12/618,639.
Final U.S. Office Action dated Mar. 28, 2013 for U.S. Appl. No. 12/686,150.
U.S. Office Action for U.S. Appl. No. 12/647,222, dated Jun. 20, 2013.
United States Office Action dated Oct. 10, 2013 issued in U.S. Appl. No. 12/647,226.
Final Office Action for U.S. Appl. No. 12/618,639 dated Nov. 26, 2013.
Final Office Action for U.S. Appl. No. 12/647,222 dated Dec. 5, 2013.
Final Office Action for U.S. Appl. No. 12/783,970 dated Dec. 26, 2013.

* cited by examiner

IMAGE DISPLAY DEVICE AND OPERATION METHOD THEREOF

BACKGROUND

1. Field

Embodiments of the present invention may relate to an image display device and an operation method thereof. More particularly, embodiments of the present invention may relate to an image display device for automatically pairing with a remote control device that can transmit signals to the image display device according to InfraRed (IR) and Radio Frequency (RF) communication standards, and an operation method thereof.

2. Background

An image display device may display video viewable to a user. The user may view broadcast programs through the image display device. The image display device may display a user-selected broadcast program on a display based on broadcast signals received from broadcasting stations. Broadcasting is undergoing a transition from analog to digital all over the world.

Digital broadcasting may refer to broadcasting digital video and audio signals. Compared to analog broadcasting, digital broadcasting may be characterized by less data loss due to its robustness against external noise, effectiveness in error correction, high resolution, and/or clean and clear images. In addition, digital broadcasting may enable interactive services, unlike analog broadcasting.

As video signals displayable on the image display device increase in type and number and more services are accessible through the image display device, a remote control device may have more buttons (or keys) to operate the image display device. A complex remote controller may cause inconvenience to the user.

The remote control device may transmit signals to the image display device in compliance with an Infrared Data Association (IrDA) communication standard (hereafter also referred to as an IR communication standard). The image display device may receive signals according to the IR communication standard. Due to diverse functions of the image display device, more types of commands may be required to control the image display device. In order to input various types of commands to the image display device, a remote control device may be used for transmitting and receiving signals to and from the image display device according to an RF communication standard. An RF frequency channel may be established for communications between the remote control device and the image display device.

BRIEF DESCRIPTION OF THE DRAWINGS

Arrangements and embodiments may be described in detail with reference to the following drawings in which like reference numerals refer to like elements and wherein.

DETAILED DESCRIPTION

The following description relates to operations of a pointing device and an image display device. A pointing device may be a remote control, a remote controller and/or a mobile communication terminal. For ease of illustration, the following description may discuss a remote control or a remote controller, although other types of pointing device may also be used.

Figure 1:
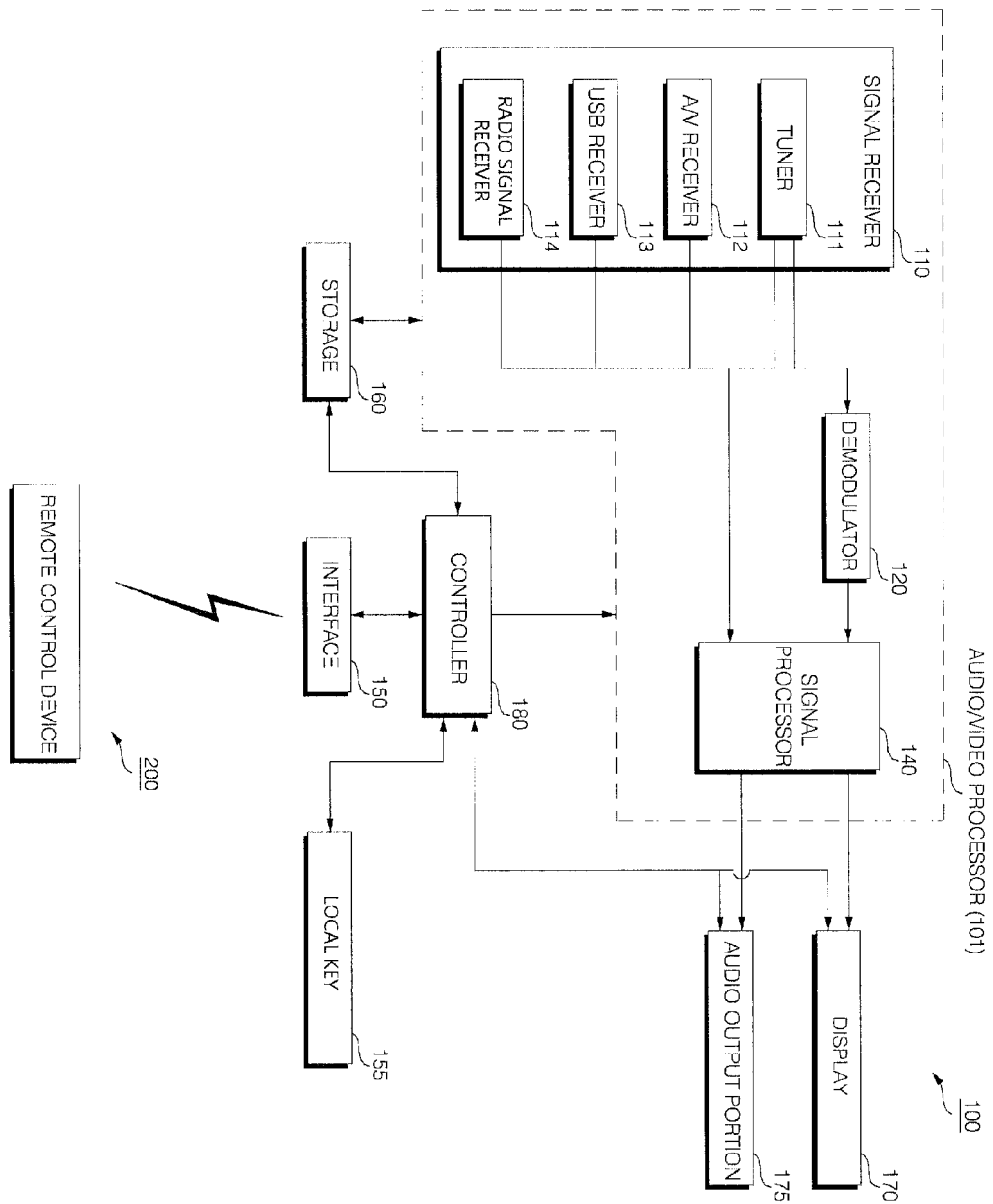
FIG. 1 is a block diagram of an image display device according to an exemplary embodiment of the present invention.

FIG. 1 is a block diagram of an image display device according to an exemplary embodiment of the present invention. Other embodiments and configurations may also be within the scope of the present invention.

FIG. 1 shows an image display device 100 that may include an audio/video processor 101, an interface 150, a local key 155, a storage 160 (or memory), a display 170, an audio output portion 175 and a controller 180.

The audio/video processor 101 may process a received audio or video signal so as to output audio or video to the audio output portion 175 or the display 170. The audio/video processor 101 may include a signal receiver 110, a demodulator 120 and a signal processor 140. The signal receiver 110 may include a tuner 111, an Audio/Visual (A/V) receiver 112, a Universal Serial Bus (USB) receiver 113 and a radio signal receiver 114.

The tuner 111 may select an RF broadcast signal of a user-selected channel from among a plurality of RF broadcast signals received through an antenna and downconvert the selected RF broadcast signal to an Intermediate Frequency (IF) signal or a baseband audio or video signal. For example, if the selected RF broadcast signal is a digital broadcast signal, the tuner 111 may downconvert the RF broadcast signal to a Digital IF (DIF) signal. If the selected RF broadcast signal is an analog broadcast signal, the tuner 111 may downconvert the RF broadcast signal to an analog baseband video or audio signal (Composite Video Banking Sync (CVBS)/Sound Intermediate Frequency (SIF)). That is, the tuner 111 may process a digital or analog broadcast signal. The analog baseband video or audio signal (CVBS/SIF) may be provided directly to the signal processor 140.

The tuner 111 may receive a single-carrier RF broadcast signal based on Advanced Television System Committee (ATSC) and/or a multi-carrier RF broadcast signal based on Digital Video Broadcasting (DVB).

The image display device 100 may also include at least two tuners. Like a first tuner, a second tuner may select an RF broadcast signal of a user-selected channel from among RF broadcast signals received through the antenna and downconvert the selected RF broadcast signal to an IF signal or a baseband video or audio signal.

The second tuner may sequentially select RF signals of all broadcast channels that have been stored by a channel memory function from among received RF broadcast signals and downconvert the selected RF signals to IF signals or baseband video or audio signals. The second tuner may perform the downconversion of the RF signals of all broadcast channels periodically. The image display device 100 may provide video signals of a plurality of channels downconverted by the second tuner in thumbnails, while displaying the video of a broadcast signal downconverted by the first tuner. The first tuner may downconvert a user-selected main RF broadcast signal to an IF signal or a baseband video or audio signal, and the second tuner may select all RF broadcast signals except for the main RF broadcast signal sequentially/periodically and downconvert the selected RF broadcast signals to IF signals and/or baseband video or audio signals.

The demodulator 120 may demodulate the DIF signal received from the tuner 111. For example, if the DIF signal is an ATSC signal, the demodulator 120 may demodulate the DIF signal by 8-Vestigal Side Band (8-VSB). In another example, if the DIF signal is a DVB signal, the demodulator 120 may demodulate the DIF signal by Coded Orthogonal Frequency Division Multiple Access (COFDMA) demodulation.

The demodulator 120 may further perform channel decoding. For the channel decoding, the demodulator 120 may include a Trellis decoder, a deinterleaver and a Reed Solomon decoder for Trellis decoding, deinterleaving and Reed Solomon decoding, respectively.

After the demodulation and channel decoding, the demodulator 120 may output a Transport Stream (TS) signal. A video signal, an audio signal or a data signal may be multiplexed in the TS signal. For example, the TS signal may be a Moving Picture Experts Group-2 (MPEG-2) TS having an MPEG-2 video signal and a Dolby AC-3 audio signal multiplexed. More specifically, the MPEG-2 TS may include a 4-byte header and a 184-byte payload.

The TS signal may be provided to the signal processor 140. The signal processor 140 may demultiplex and process the TS signal and output a video signal to the display 170 and an audio signal to the audio output portion 175.

An image display device having at least two tuners may have a similar number of demodulators. Additionally, a demodulator may be separately provided for each of ATSC and DVB.

The signal receiver 110 may connect the image display device 100 to an external device. The external device may be an audio or video output device such as a DVD player, a radio, an audio player, an MP3 player, a camera, a camcorder, a game player, etc. The signal receiver 110 may provide an audio, video or data signal received from the external device to the signal processor 140 for processing the video and audio signals in the image display device 100.

In the signal receiver 110, the A/V receiver 112 may include a CVBS port, a component port, a S-video port (analog), a Digital Visual Interface (DVI) port, a High Definition Multimedia Interface (HDMI) port, a Red, Green, Blue (RGB) port, a D-SUB port, an Institute of Electrical and Electronics Engineers (IEEE) 1394 port, an Sony/Phillips Digital InterFace (SPDIF) port, a Liquid HD port, etc. in order to provide audio and video signals received from the external device to the image display device 100. Analog signals received through the CVBS port and the S-video port may be provided to the signal processor 140 after analog-to-digital conversion. Digital signals received through the other input ports may be provided to the signal processor 140 without analog-to-digital conversion.

The USB receiver 113 may receive audio and video signals through the USB port.

The radio signal receiver 114 may connect the image display device 100 to a wireless network. The image display device 100 may access a wireless Internet through the radio signal receiver 114. For connection to the wireless Internet, a communication standard may be used, such as Wireless Local Area Network (WLAN) (Wi-Fi), Wireless Broadband (WiBro), Worldwide Interoperability for Microwave Access (Wimax), High Speed Downlink Packet Access (HSDPA), etc. Further, the radio signal receiver 114 may conduct short-range communications with another electronic device. For example, the radio signal receiver 114 may be networked to another electronic device by a communication standard like Bluetooth, Radio Frequency Identification (RFID), InfraRed Data Association (IrDA), Ultra Wideband (UWB), ZigBee, etc.

The signal receiver 110 may connect the image display device 100 to a set-top box (or a similar type of device). For example, if the set-top box operates for Internet Protocol (IP) TV, the signal receiver 110 may transmit an audio, video or data signal received from the IP TV set-top box to the signal processor 140 and a processed signal received from the signal processor 140 to the IP TV set-top box.

The signal processor 140 may demultiplex a received TS signal (e.g. an MPEG-2 TS) into an audio signal, a video signal and a data signal. The signal processor 140 may also process the demultiplexed video signal. For example, if the demultiplexed video signal was coded, the signal processor 140 may decode the video signal. More specifically, if the demultiplexed video signal is an MPEG-2 coded video signal, an MPEG-2 decoder may decode the video signal. If the demultiplexed video signal was coded in compliance with H.264 for Digital Multimedia Broadcasting (DMB) or Digital Video Broadcasting-Handheld (DVB-H), an H.264 decoder may decode the video signal.

The signal processor 140 may control brightness, tint, and/or color for the video signal. The video signal processed by the signal processor 140 may be displayed on the display 170.

The signal processor 140 may also process the demultiplexed audio signal. For example, if the demultiplexed audio signal was coded, the signal processor 140 may decode the audio signal. More specifically, if the demultiplexed audio signal is an MPEG-2 coded audio signal, an MPEG-2 decoder may decode the audio signal. If the demultiplexed audio signal was coded in compliance with MPEG 4 Bit Sliced Arithmetic Coding (BSAC) for terrestrial DMB, an MPEG 4 decoder may decode the audio signal. If the demultiplexed audio signal was coded in compliance with MPEG 2 Advanced Audio Codec (AAC) for satellite DMB or DVB-H, an AAC decoder may decode the audio signal.

The signal processor 140 may control base, treble, and/or volume for the audio signal. The audio signal processed by the signal processor 140 may be provided to the audio output portion 175.

The signal processor 140 may also process the demultiplexed data signal. For example, if the demultiplexed data signal was coded, the signal processor 140 may decode the data signal. The coded data signal may be Electronic Program Guide (EPG) information including broadcasting information such as starts, ends, etc. of broadcast programs of each channel. For example, the EPG information may be ATSC-Program and System Information Protocol (ATSC-PSIP) information in case of ATSC. For DVB, the EPG information may include DVB-Service Information (DVB-SI). The ATSC-PSIP information or DVB-SI may be included in the 4-byte header of the above-described TS (i.e., MPEG-2 TS).

The signal processor 140 may perform an On-Screen Display (OSD) function. More specifically, the signal processor 140 may display information graphically or in text on the display 170 based on at least one of the processed video and data signals or a user input signal received through a remote control device 200. The remote control device may also be referred to as a pointing device. The remote control device 200 may be a mobile communication terminal.

The storage 160 (or memory) may store programs for signal processing and control operations of the controller 180 and store processed video, audio and/or data signals. The storage 160 may temporarily store video, audio and/or data signals received at the signal receiver 110.

The storage 160 may include a storage medium of at least one type of flash memory, hard disk, multimedia card micro type, card-type memory (e.g. Secure Digital (SD) or eXtreme Digital (XD) memory), Random Access Memory (RAM), and Read Only Memory (ROM) (e.g. Electrically Erasable Programmable ROM (EEPROM)). The image display device 100 may reproduce a file stored in the storage 160 (e.g. a moving picture file, a still image file, a music file, a text file, etc.) and provide the reproduced file to the user.

The controller 180 may provide overall control to the image display device 100. The controller 180 may receive a signal from the remote control device 200 via the interface 150. The controller 180 may identify a command input to the remote control device 200 by the received signal and control the image display device 100 based on the command. For example, upon receipt of a predetermined channel selection command from the user, the controller 180 may control the tuner 111 to provide a selected channel through the signal receiver 110. The controller 180 may control the signal processor 140 to process the audio and video signals of the selected channel. The controller 180 may control the signal processor 140 to output user-selected channel information along with the processed audio and video signals to the display 170 and/or the audio output portion 175.

In another example, the user may input a different-type video and/or audio output command using the remote control device 200. The user may want to view a video signal of a camera or a camcorder received through the USB receiver 113 rather than a broadcast signal. The controller 180 may control the audio/video processor 101 such that an audio or video signal received through the USB receiver 113 of the signal receiver 110 may be processed by the signal processor 140 and output to the display 170 and/or the audio output portion 175.

Besides a command received through the remote control device 200, the controller 180 may identify a user command received through the user input portion 155 provided to the image display device 100 and control the image display device 100 based on the user command. For example, the user may input an on/off command, a channel switch command, a volume change command, and/or the like for the image display device 100 through the user input portion 155. The user input portion 155 may include buttons and/or keys formed in the image display device 100. The controller 180 may determine whether the user input portion 155 has been manipulated and control the image display device 100 based on the determination.

Figure 2A:
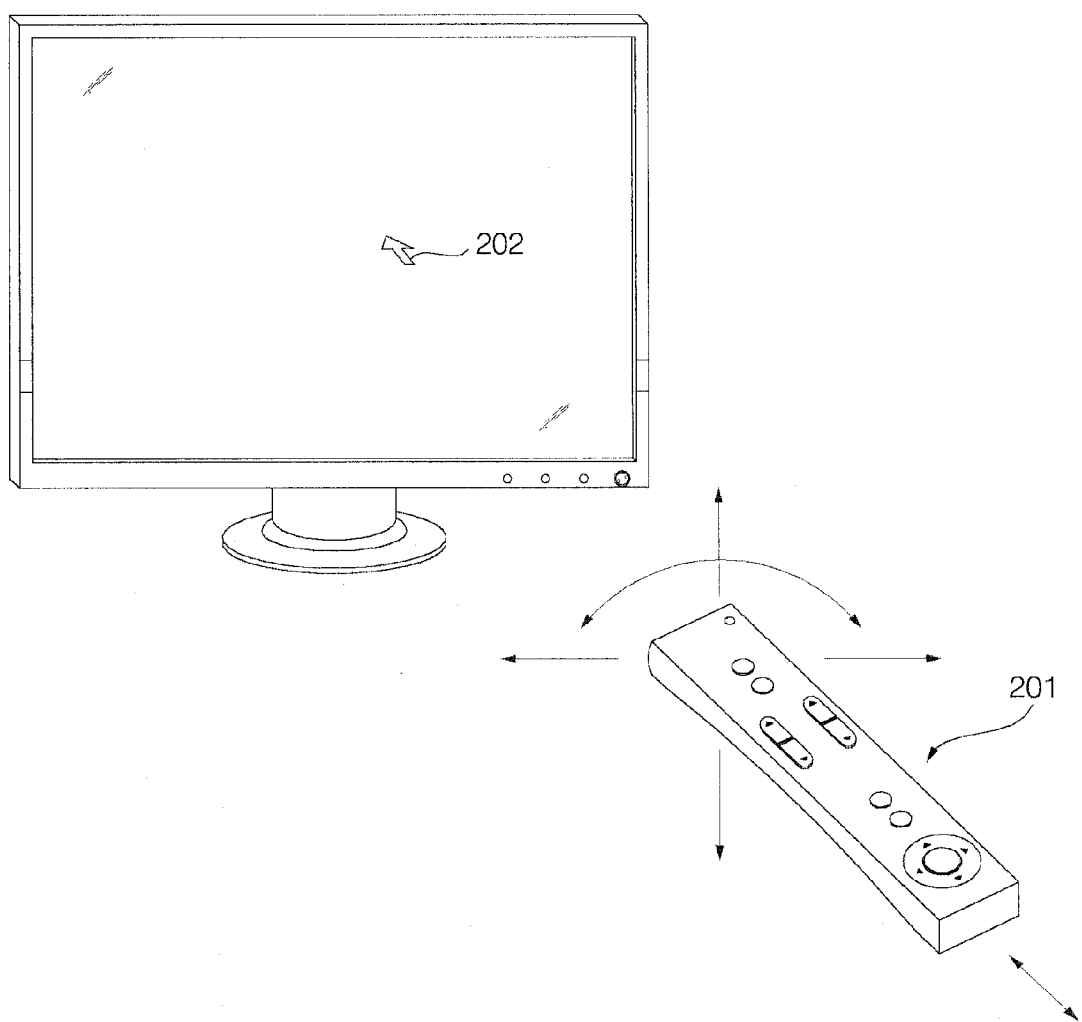
FIGS. 2A and 2B are frontal perspective views of the image display device and a 3-Dimensional (3D) remote controller according to an exemplary embodiment of the present invention.
Figure 2B:
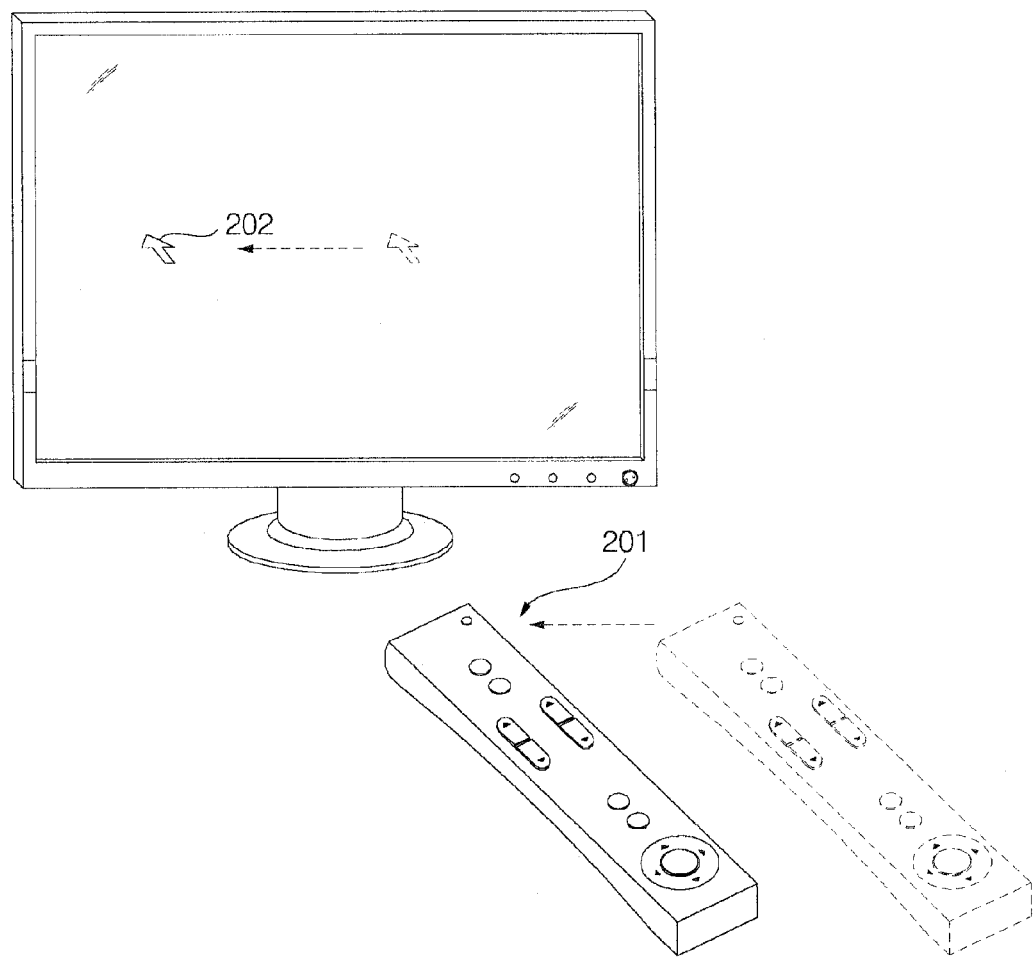

FIGS. 2A and 2B are frontal perspective views of the image display device 100 and a 3D remote controller 201 for inputting a command to the image display device 100 according to an exemplary embodiment of the present invention. Other embodiments and configurations may also be within the scope of the present invention.

The 3D remote controller 201 may be a kind of the remote control device 200 for inputting a command to the image display device 100. The remote controller 201 may also be referred to as a pointing device. The remote controller 20 may be a subscriber unit or mobile communication terminal. The 3D remote controller 201 may transmit and receive signals to and from the image display device 100 in compliance with an RF communication standard. As shown in FIG. 2A, a pointer 202 corresponding to the 3D remote controller 201 may be displayed on the image display device 100.

The user may move the 3D remote controller 201 up, down, left, right, forward or backward, and/or rotate the remote controller 201. The pointer 202 may move on the image display device 100 in correspondence with the movement and/or rotation of the 3D remote controller 201.

FIG. 2B illustrates a movement of the pointer 202 on the image display device 100 based on a movement of the remote controller 201. As shown in FIG. 2B, when the user moves the 3D remote controller 201 to the left, the pointer 202 may also move to the left on the image display device 100. The 3D remote controller 201 may include a sensor for sensing movement of the remote controller 201. Information about movement of the 3D remote controller 201 as sensed by the sensor may be provided to the image display device 100. The image display device 100 may determine the movement of the remote controller 201 based on the received information and calculate coordinates of the pointer 202 based on the movement of the remote controller 201.

In FIGS. 2A and 2B, the pointer 202 may move on the image display device 100 in correspondence with an upward, downward, left or right movement and/or rotation of the 3D remote controller 201. The velocity and/or direction of the pointer 200 may correspond to that of the remote controller 201. The pointer 202 may move on the image display device 100 in correspondence with movement of the remote controller 201. A movement of the remote controller 201 may trigger entry of a predetermined command to the image display device 100. If the 3D remote controller 201 may move forward or backward, an image displayed on the image display device 200 may be enlarged and/or contracted (i.e., reduced).

Figure 3:
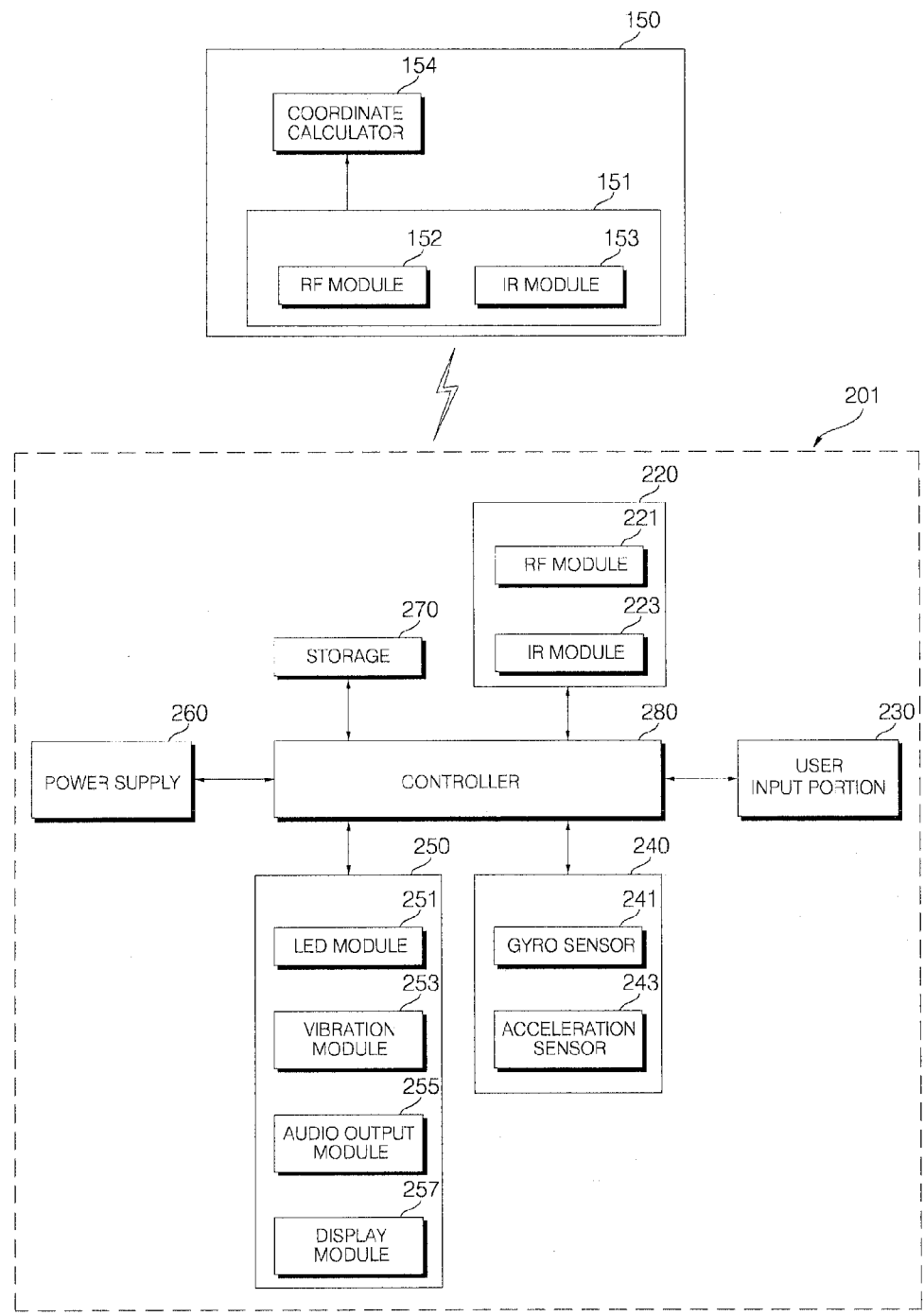
FIG. 3 is a block diagram of the 3D remote controller according to an exemplary embodiment of the present invention.

FIG. 3 is a block diagram of the 3D remote controller 201 and the user interface 150 of the image display device 100 according to an exemplary embodiment of the present invention. Other embodiments and configurations may also be within the scope of the present invention.

As shown in FIG. 3, the 3D remote controller 201 may include a radio signal transceiver 220, a user input portion 230, a sensor portion 240, an output portion 250, a power supply 260, a storage 270 (or memory) and a controller 280.

The radio signal transceiver 220 may transmit and receive signals to and from the image display device 100. The 3D remote controller 201 may be provided with a radio frequency (RF) module 221 for transmitting and receiving signals to and from the interface 150 of the image display device 100 based on an RF communication standard. The 3D remote controller 201 may include an infrared (IR) module 223 for transmitting and receiving signals to and from the interface 150 of the image display device 100 based on an IR communication standard. Accordingly, the remote controller 201 (or pointing device) may include a first wireless communication module (i.e., the RF module 221) and a second wireless communication module (i.e., the IR module 223).

The 3D remote controller 201 may transmit a signal carrying information about an operation of the 3D remote controller 201 to the image display device 100 through the RF module 221. The 3D remote controller 201 may receive a signal from the image display device 100 through the RF module 221. The 3D remote controller 201 may transmit commands associated with power on/off, channel switching, volume change, etc. to the image display device 100 through the IF module 223.

The user input portion 230 may be configured with a keypad and/or buttons. The user may input a command related to the image display device 100 to the 3D remote controller 201 by manipulating the user input portion 230. If the user input portion 230 includes hard key buttons, the user may input commands related to the image display device 100 to the 3D remote controller 201 by pushing the hard key buttons. If the user input portion 230 is provided with a touch screen, the user may input commands related to the image display device 100 to the 3D remote controller 201 by touching soft keys on the touch screen. The user input portion 230 may have a variety of input means the user can manipulate, such as a scroll key, a zog key, etc., although embodiments are not limited thereto.

The sensor portion 240 may include a gyro sensor 241 and/or an acceleration sensor 243. The gyro sensor 241 may sense information about an operation of the 3D remote controller 201. For example, the gyro sensor 241 may sense information about an operation of the 3D remote controller 201 along x, y and z axes. The acceleration sensor 243 may sense information about velocity of the 3D remote controller 201.

The output portion 250 may output a video or audio signal corresponding to a manipulation of the user input portion 230 or a signal transmitted by the image display device 100. The user may be aware from the output portion 250 whether the user input portion 230 has been manipulated or the image display device 100 has been controlled.

For example, the output portion 250 may include a Light Emitting Diode (LED) module 251 for illuminating when the user input portion 230 has been manipulated or a signal is transmitted to or is received from the image display device 100 through the radio signal transceiver 220. The output portion 250 may also include a vibration module 253 for generating vibrations, an audio output module 255 for outputting audio, and/or a display module 257 for outputting video.

The power supply 260 may supply power to the 3D remote controller 201. When the 3D remote controller 201 is kept stationary for a predetermined time period, the power supply 260 may block power (or reduce power) for the 3D remote controller 201. When a predetermined key of the 3D remote controller 201 is manipulated, the power supply 260 may resume power supply.

In one embodiment, the RF module 221 may be used to turn power of the image display device (such as a television) either on or off. In another embodiment, the IR module 223 may be used to turn power of the image display device either on or off. In another embodiment, all wireless communication between the remote controller 201 and the image display device 100 may be performed using the IR module 223. The powering on of the image display device may use both or either of IR signals or RF signals before establishing pairing.

The storage 270 (or memory) may store a plurality of types of programs required for control or operation of the 3D remote controller 201 and/or application data. When the 3D remote controller 201 wirelessly transmits and receives signals to and from the image display device 100 through the RF module 221, the signal transmission and reception may be carried out in a predetermined frequency band. The controller 280 of the 3D remote controller 201 may store information about the frequency band in which to wirelessly transmit and receive signals to and from the image display device 100 paired with the 3D remote controller 201 and refer to the information.

The controller 280 may provide overall control to the 3D remote controller 201. The controller 280 may transmit a signal corresponding to a predetermined key manipulation on the user input portion 230 and/or a signal corresponding to an operation of the 3D remote controller 201 sensed by the sensor portion 240 to the interface 150 of the image display device 100 through the radio signal transceiver 220.

The interface 150 of the image display device 100 may have a radio signal transceiver 151 for wirelessly transmitting and receiving signals to and from the 3D remote controller 201, and a coordinate calculator 154 for calculating coordinates of the pointer corresponding to an operation of the 3D remote controller 201.

The interface 150 may transmit and receive signals wirelessly to and from the 3D remote controller 201 through the RF module 152. The interface 150 may also receive a signal based on the IR communication standard from the 3D remote controller 201 through the IR module 153.

The coordinate calculator 154 may calculate the coordinates (x, y, z) of the pointer 202 to be displayed on the display 170 by correcting handshaking or errors from a signal corresponding to an operation of the 3D remote controller 201 received through the radio transceiver 151.

A signal received from the 3D remote controller 201 through the interface 150 may be provided to the controller 180 of the image display device 100. The controller 180 may identify information about an operation of the 3D remote controller 201 and/or a key manipulation on the 3D remote controller 201 from the received signal and control the image display device 100 based on the information.

In another example, the 3D remote controller 201 may calculate the coordinates of the pointer 202 corresponding to its operation and output the coordinates to the interface 150 of the image display device 100. The interface 150 of the image display device 100 may then transmit information about the received coordinates to the controller 180 without correcting handshaking or errors.

FIGS. 1, 2 and 3 illustrate the image display device 100 and the 3D remote controller 201 (as the remote control device 200). Components of the image display device 100 and the 3D remote controller 201 may be integrated or omitted, and/or a new component may be added. That is, two or more components may be incorporated into a single component or one component may be configured to be divided into two or more separate components. Also, the function of each block is presented for illustrative purposes, and does not limit the scope of embodiments.

Figure 4:
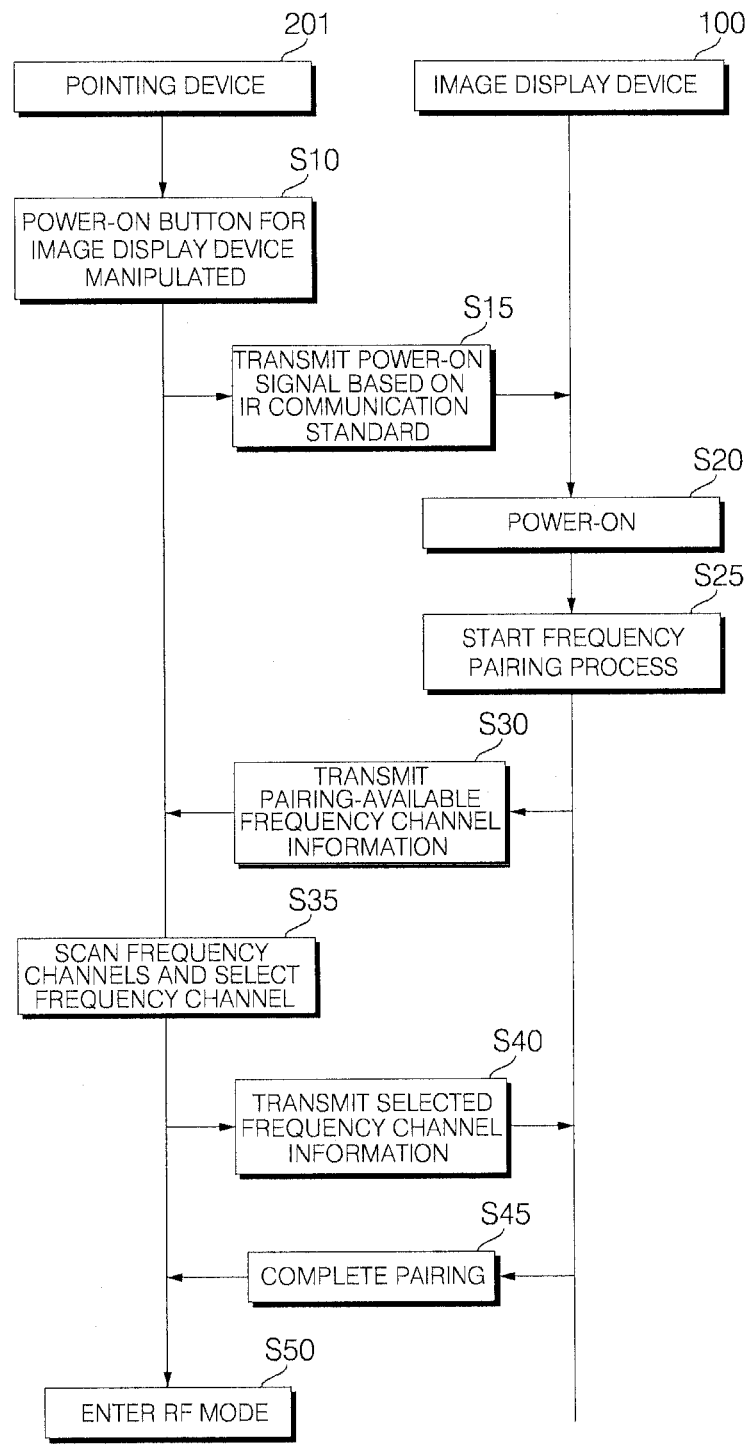
FIG. 4 is a flowchart illustrating a method for pairing or operating the image display device according to an exemplary embodiment of the present invention.

FIG. 4 is a flowchart illustrating a method for pairing the 3D remote controller 201 (as a remote control device) with the image display device 100 according to an exemplary embodiment of the present invention. Other operations, orders of operations and embodiments may also be within the scope of the present invention.

The 3D remote controller 201 may transmit a signal to the image display device 100 in compliance with IR communication standards and/or RF communication standards. Before pairing with the image display device 100, the 3D remote controller 201 may transmit a signal to the image display device 100 according to the IR communication standard.

As shown in FIG. 4, upon manipulation of a power-on button for turning on the image display device 100 (before pairing) in operation S10, the 3D remote controller 201 may transmit a power-on signal to the image display device 100 based on the IR communication standard in operation S15.

Upon receipt of the IR power-on signal, the image display device 100 may be turned on in operation S20 and then start a frequency pairing process in operation S25. Launching a frequency pairing-related platform may trigger the frequency pairing process in the image display device 100. Upon launching of the frequency pairing-related platform, the image display device 100 may display a frequency pairing-related screen on the display 170 so that the user is aware of a start of the frequency pairing process in the image display device 100.

As the frequency pairing process starts, the image display device 100 may transmit information about pairing-available frequency channels (i.e., pairing-available frequency channel information) to the 3D remote controller 201 in operation S30. For example, the image display device 100 may transmit information about at least 10 frequency bands that are available for transmission and reception to and from the 3D remote controller 201 that is paired with the image display device 100.

In operation S35, the 3D remote controller 201 may scan the frequency channels indicated by the pairing-available frequency channel information and select a pairing frequency channel from among the scanned frequency channels. The selected frequency channel may have a highest of the reception sensitivities of the scanned frequency channels, or a least of noise or interference of the scanned frequency channels.

The 3D remote controller 201 may transmit information about the selected frequency channel to the image display device 100 in operation S40. The image display device 100 may establish a pairing frequency channel based on the received information. Thus, the pairing including establishing a pairing frequency channel may be completed. The image display device 100 may transmit an ACKnowledgment (ACK) signal indicating completion of the pairing to the 3D remote controller 201 in operation S45.

Upon receipt of the ACK signal, the 3D remote controller 201 may enter RF mode in operation S50. When a button or a key of the user input portion 230 is manipulated, the 3D remote controller 201 may transmit a signal corresponding to the manipulated button or key to the image display device 100 based on the RF communication standard. The remote controller 201 may be considered to be in an RF mode. When the user moves the 3D remote controller 201 in a predetermined pattern, the 3D remote controller 201 may transmit information about its movement sensed by the sensor portion 240 to the image display device 100 by an RF signal.

Figure 5A:
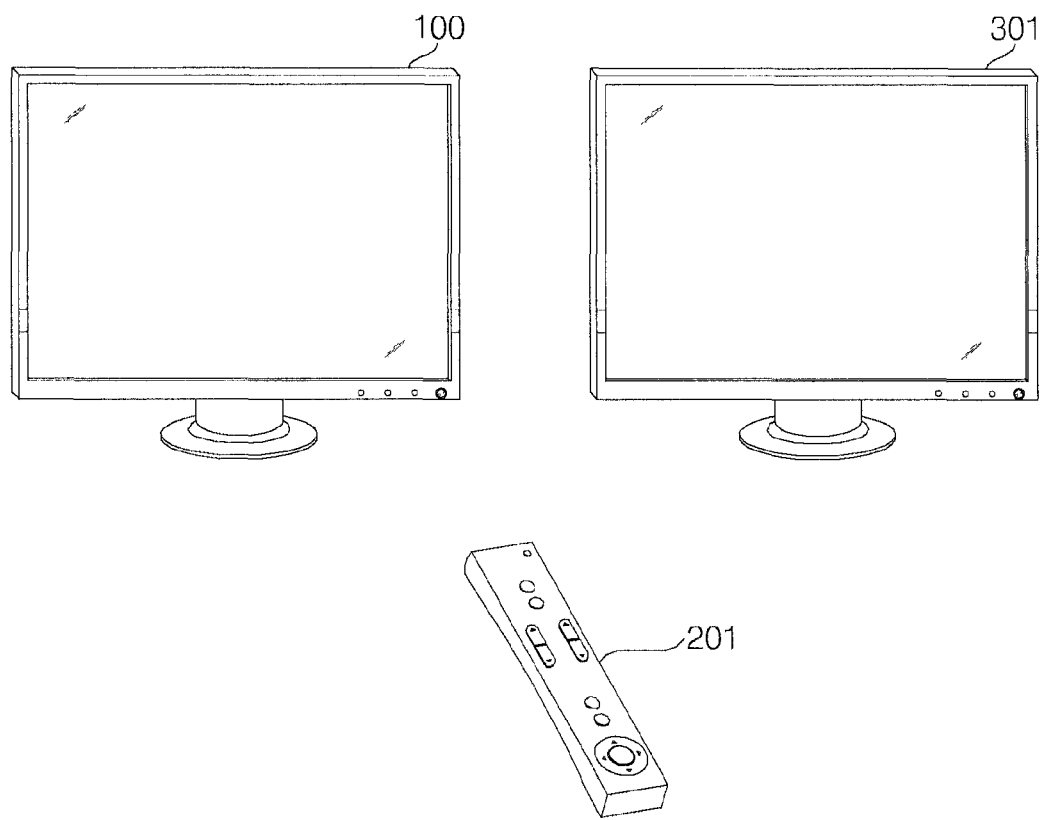
FIGS. 5A and 5B are perspective views illustrating exteriors of image display devices and 3D-remote controllers according to other exemplary embodiments of the present invention.
Figure 5B:
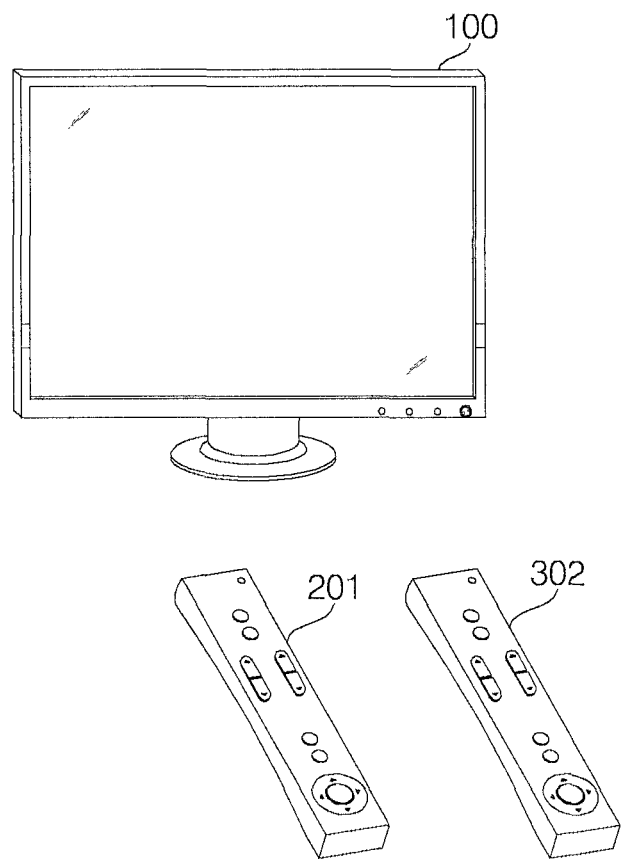

FIGS. 5A and 5B are perspective views illustrating exteriors of image display devices and 3D-remote controllers that can be paired according to an exemplary embodiment of the present invention. Other embodiments and configurations may also be within the scope of the present invention.

FIG. 5A shows the exterior of the 3D remote controller 201 pairable with at least two image display devices 100 and 301. The 3D remote controller 201 may be paired with the first and second image display devices 100 and 301 over different frequency channels.

The 3D remote controller 201 may store information about a frequency channel on which it has been paired with an external device (i.e., pairing frequency channel information) in the storage 270. After pairing with the second image display device 301, the 3D remote controller 201 may pair with the first image display device 100. In this case, the 3D remote controller 201 may refer to information about a pairing frequency channel established with the second image display device 301 before selecting a pairing frequency channel for the first image display device 100. The 3D remote controller 201 may select a frequency channel other than the pairing frequency channel of the third image display device 301 as a pairing frequency channel for the first image display device 100.

The 3D remote controller 201 may map pairing frequency channel information to information about the image display devices that have been paired with the 3D remote controller 201 on the pairing frequency channels when storing the pairing frequency channel information. The information about the image display devices paired with the 3D remote controller 201 may be and/or their product numbers or Identifiers (IDs).

FIG. 5B illustrates the exterior of the image display device 100 pairable with at least two 3D remote controllers 201 and 302. When the image display device 100 is paired with the two 3D remote controllers 201 and 302, the user may control the image display device 100 by means of one of the 3D remote controllers 201 and 302.

Upon power-on, the image display device 100 may begin a frequency pairing process to pair with the first 3D remote controller 201. The image display device 100 may already have been paired with another external device. The pairing may already have been carried out between the image display device 100 and the second 3D remote controller 302.

The image display device 100 may refer to pairing frequency channel information about the second 3D remote controller 302 before transmitting pairing-available frequency channel information to the first 3D remote controller 201. The image display device 100 may then transmit the pairing-available frequency channel information specifying frequency channels other than the pairing frequency channel of the second 3D remote controller 302 to the first 3D remote controller 201. The first 3D remote controller 201 may select one of the frequency channels indicated by the pairing-available frequency channels and notify the image display device 100 of the selected frequency channel. The image display device 100 may then establish a pairing frequency channel for the first 3D remote controller 201 based on information about the selected frequency channel.

The image display device 100 may store map information about the pairing frequency channel of the first 3D remote controller 201 in the storage 160. When storing pairing frequency channel information about external devices, the image display device 100 may map the pairing frequency channel information to information about the external devices. The information about the external devices may be and/or include their product numbers or IDs.

Figure 6:
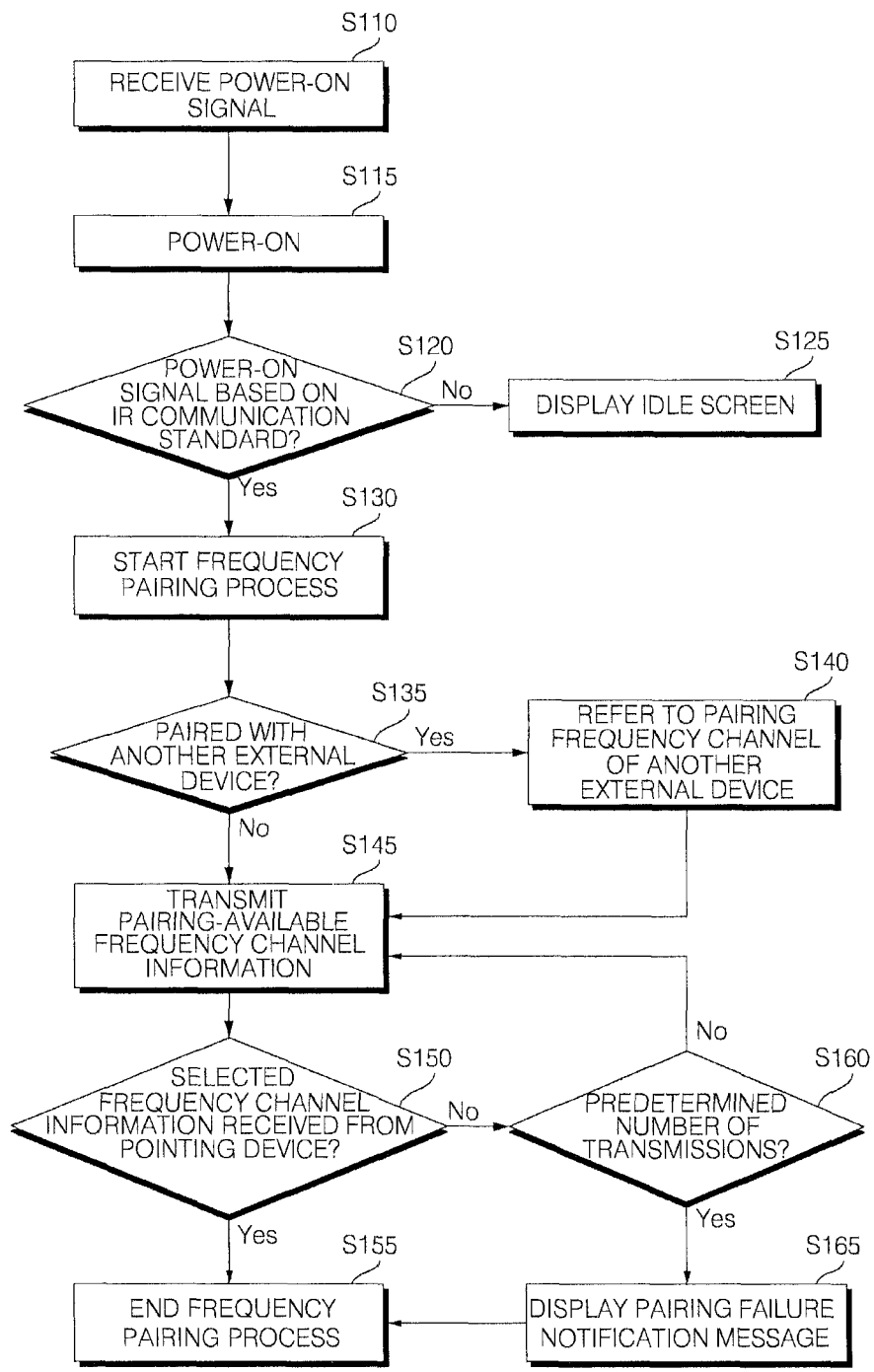
FIG. 6 is a flowchart illustrating a pairing method of an image display device according to an exemplary embodiment of the present invention.

FIG. 6 is a flowchart illustrating a method for pairing with a 3D remote controller in an image display device according to an exemplary embodiment of the present invention. Other operations, orders of operations and embodiments may also be within the scope of the present invention.

As shown in FIG. 6, upon receipt of a power-on signal based on the IR communication standard from the 3D remote controller 201 in operation S110, the image display device 100 may be turned on in operation S115.

The image display device 100 may then determine whether the power-on signal is based on the IR communication standard (i.e., an IR signal) in operation S120. If the power-on signal is a signal based on the RF communication standard (i.e., an RF signal), the image display device 100 may display an idle screen on the display 170 in operation S125.

On the other hand, if the power-on signal is an IR signal, a frequency pairing platform may be launched in the image display device 100. The image display device 100 may start a frequency pairing process in operation S130. Before transmitting pairing-available frequency channel information to the 3D remote controller 201, the image display device 100 may determine whether it has already been paired with another external device in operation S135. The external device may be another 3D remote controller for inputting a command to the image display device 100, a camera, a camcorder, a Web server, a DVD player, and/or the like for transmitting an audio or video signal to the image display device 100.

In the presence of another external device paired with the image display device 100, the image display device 100 may refer to a pairing frequency channel established with the external device in operation S140 and transmit pairing-available frequency channel information specifying frequency channels other than the pairing frequency channel of the external device to the 3D remote controller 201 in operation S145.

The 3D remote controller 201 may scan the frequency channels indicated by the pairing-available frequency channel information, select a pairing frequency channel from among the scanned frequency channels, and transmit information about the selected frequency channel to the image display device 100.

Upon receipt of the information about the selected frequency channel within a predetermined time after transmitting the pairing-available frequency channel information in operation S150, the image display device 100 may establish a pairing frequency channel for the 3D remote controller 201 based on the received information and end the frequency pairing process in operation S155. The image display device 100 may store information about the pairing frequency channel of the 3D remote controller 201 by mapping information about the 3D remote controller 201 to the pairing frequency channel information.

On the contrary, if the image display device 100 fails to receive the selected frequency channel information within the predetermined time, the image display device 100 may retransmit the pairing-available frequency channel information to the 3D remote controller 201 a predetermined number of times in operation S160. Nonetheless, when the image display device 100 fails to receive the selected frequency channel information from the 3D remote controller 201, the image display device 100 may display a pairing failure notification message on the display 170 in operation S165 and then end the frequency pairing process in operation S155.

Figure 7:
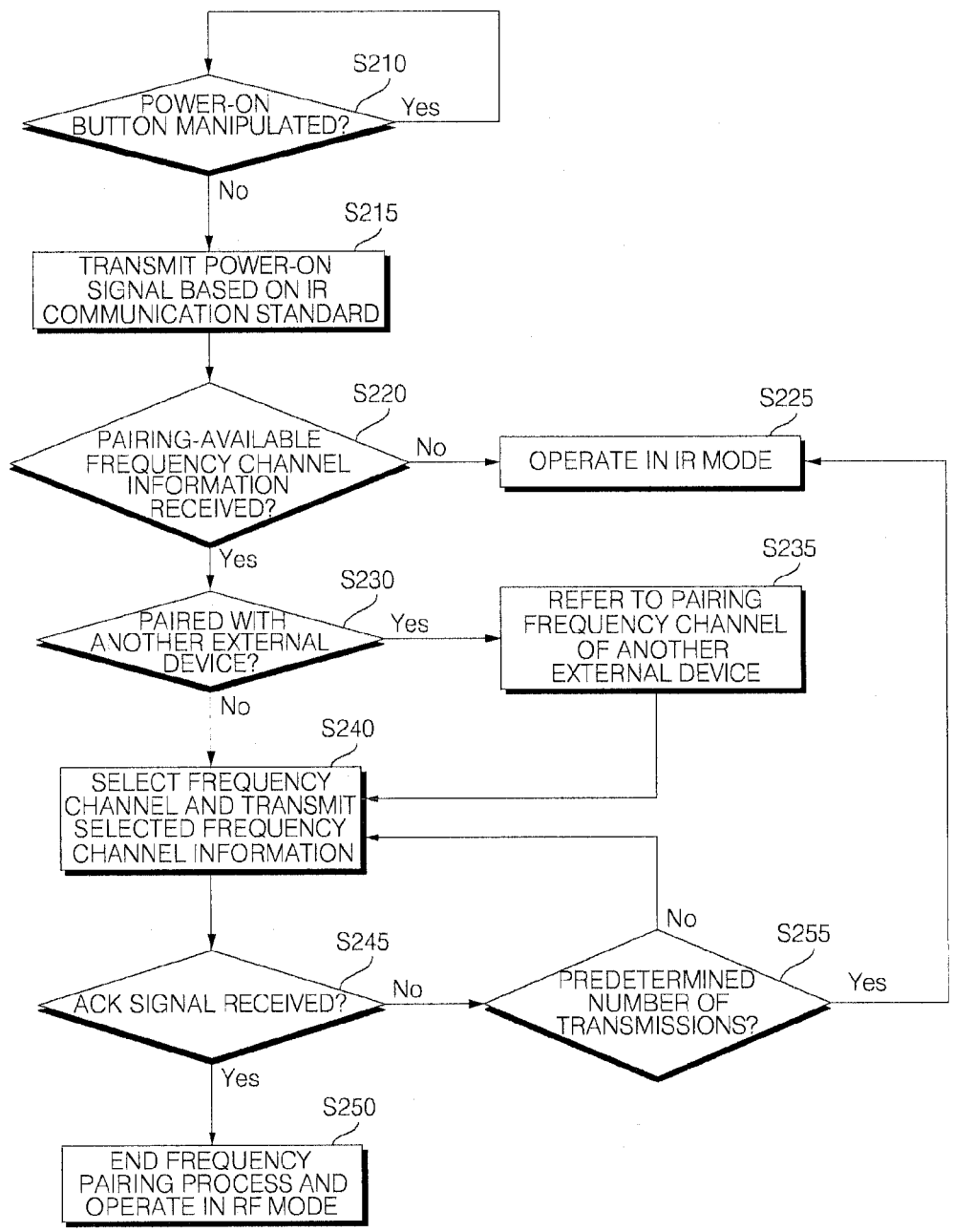
FIG. 7 is a flowchart illustrating a pairing method of a 3D remote controller according to an exemplary embodiment of the present invention.

FIG. 7 is a flowchart illustrating a method for pairing with an image display device in a 3D remote controller according to an exemplary embodiment of the present invention. Other operations, orders of operations and embodiments may also be within the scope of the present invention.

As shown in FIG. 7, the user may input a power-on command to the image display device 100 by manipulating a power-on button in operation S210. The 3D remote controller 201 may monitor manipulation of the power-on button. If it is determined that the power-on key has been manipulated, the 3D remote controller 201 may transmit an IR power-on signal to the image display device 100 in operation S215.

Upon receipt of the IR power-on signal, the image display device 100 may be turned on. The image display device 100 may then perform a frequency pairing process and transmit a signal carrying pairing-available frequency channel information to the 3D remote controller 201.

When failing to receive the pairing-available frequency channel information, the 3D remote controller 201 may enter the IR mode and operate in the IR mode in operation S225. Upon user-manipulation of a button or a key of the 3D remote controller 201, the 3D remote controller 201 may transmit an IR signal corresponding to the manipulated button or key to the image display device 100. The remote controller 201 may be considered to be in an IR mode.

On the other hand, upon receipt of the pairing-available frequency channel information, the 3D remote controller 201 may determine whether the remote controller 201 has already been paired with another external device in operation S230. In the presence of another paired external device, the 3D remote controller 201 may refer to pairing frequency channel information about the external device in operation S235, and select a frequency channel other than a pairing frequency channel of the external device as a pairing frequency channel and transmit information about the selected frequency channel to the image display device 100 in operation S240.

In the absence of another paired external device, the 3D remote controller 201 may scan pairing-available frequency channels, select a frequency channel having a highest reception sensitivity and/or a least noise or interference, and transmit information about the selected frequency channel to the image display device 100 in operation S240.

Upon receipt of an ACK signal in response to the selected frequency channel information from the image display device 100 that has established a pairing frequency channel in operation S245, the 3D remote controller 201 may end the pairing process and operate in the RF mode in operation S250. In the RF mode, the 3D remote controller 201 may transmit an RF signal corresponding to a user-manipulated button or key to the image display device 100.

When the 3D remote controller 201 fails to receive the ACK signal after a predetermined number of transmissions of the selected frequency channel information to the image display device 100 in operation S255, the remote controller 201 enters the IR mode in operation S225.

Figure 8A:
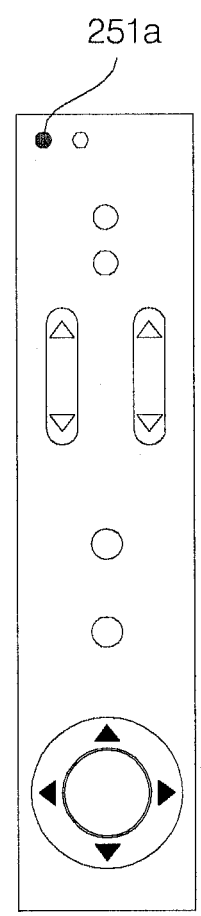
FIGS. 8A and 8B illustrate an exterior of a 3D remote controller according to an exemplary embodiment of the present invention.
Figure 8B:
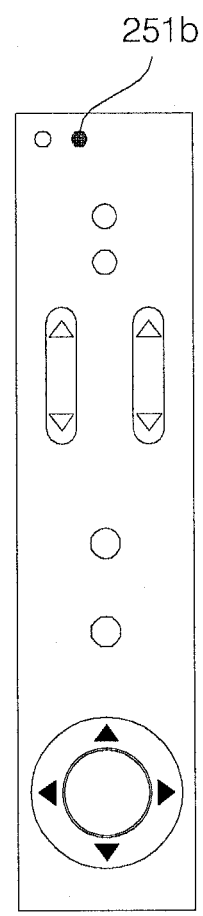

FIGS. 8A and 8B illustrate an exterior of a 3D remote controller for transmitting signals to an image display device according to an IR communication standard or an RF communication standard according to an exemplary embodiment of the present invention. Other embodiments and configurations may also be within the scope of the present invention.

The 3D remote controller 201 capable of transmitting a command to the image display device 100 may transmit a signal to the image display device 100 based on the IR communication standard. The 3D remote controller 201 capable of transmitting a command to the image display device 100 may transmit and receive signals to and from the image display device 100 based on the RF communication standard.

After pairing with the image display device 100 is completed, the 3D remote controller 201 may transmit and receive RF signals to and from the image display device 100. Therefore, when the image display device 100 is powered-on, the 3D remote controller 201 may transmit an IR signal to the image display device 100. FIGS. 8A and 8B illustrate the exterior of the 3D remote controller 201 that can transmit a power-on signal to the image display device in compliance with the IR communication standard. The user may recognize a current mode of the 3D remote controller 201 by an illumination state of a first LED 251*a* and a second LED 251*b* of the 3D remote controller 201. The 3D remote controller 201 may be in the IR mode in which a signal corresponding to a manipulated button or key is transmitted to the image display device 100 based on the IR communication standard or the remote controller 201 may be in the RF mode in which a signal corresponding to a manipulated button or key is transmitted to the image display device 100 based on the RF communication standard.

When the 3D remote controller 201 is in the IR mode, the first LED 251a of the LED module 251 may be turned on, as shown in FIG. 8A. For example, when the user manipulates the power-on button for turning on the image display device 100 in the 3D remote controller 201, the 3D remote controller 201 may transmit a power-on signal corresponding to the power-on button to the image display device 100. The 3D remote controller 201 operating in the IR mode may transmit the power-on signal to the image display device based on the IR communication standard. The 3D remote controller 201 may turn on the first LED 251a.

When the user pairs the 3D remote controller 201 with the image display device 100 via a GUI provided by the turned-on image display device 100, the 3D remote controller 201 may operate in the RF mode. The 3D remote controller 201 operating in the RF-mode may transmit a signal corresponding to a user-manipulated button or key to the image display device 100 based on the RF communication standard. The 3D remote controller 201 may turn on the second LED 251b when transmitting or receiving an RF signal.

In this manner, the user may be aware of the current mode of the 3D remote controller 201 from on/off states of the first and second LEDs 251a and 251b.

Figure 9A:
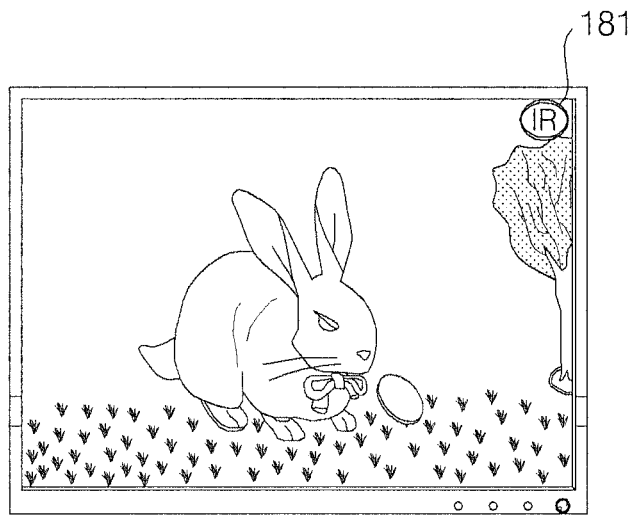
FIGS. 9A and 9B illustrate screens having images displayed in an image display device according to an exemplary embodiment of the present invention.
Figure 9B:
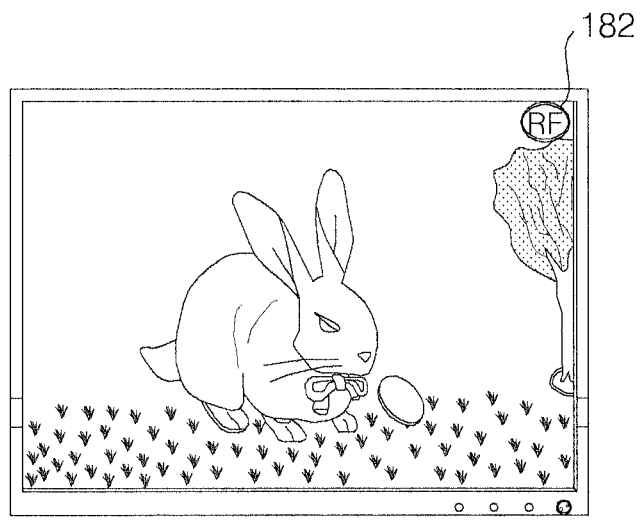

FIGS. 9A and 9B illustrate screens having images displayed on the display 170 of the image display device 100 according to an exemplary embodiment of the present invention. Other screens, embodiments and configurations may also be within the scope of the present invention.

As shown in FIGS. 9A and 9B, the image display device 100 may indicate whether it has been paired with the 3D remote controller 201 that transmitted a power-on signal to the image display device 100 in the IR mode by displaying an icon 181 or 182 on the display 170.

As shown in FIG. 9A, if the image display device 100 has been power-on by receiving a power-on signal from the 3D remote controller 201 based on the IR communication standard but has not been paired completely with the 3D remote controller 201, the image display device 100 may display the icon 181 on the display 170. Each time the image display device 100 receives an IR signal from the 3D remote controller 201, it may display the icon 181 on the display 170.

As shown in FIG. 9B, when the image display device 100 has been power-on by receiving a power-on signal from the 3D remote controller 201 based on the IR communication standard and has been paired with the 3D remote controller 201, the image display device 100 may display the icon 182 on the display 170. Each time the image display device 100 receives an RF signal from the 3D remote controller 201, the image display device 100 may display the icon 182 on the display 170.

In the manner shown in FIGS. 8A and 8B or FIGS. 9A and 9B, the user may be aware whether the 3D remote controller 201 has been paired with the image display device 100 and whether signal transmission and reception are performed between them in the IR communication standard or the RF communication standard.

Figure 10:
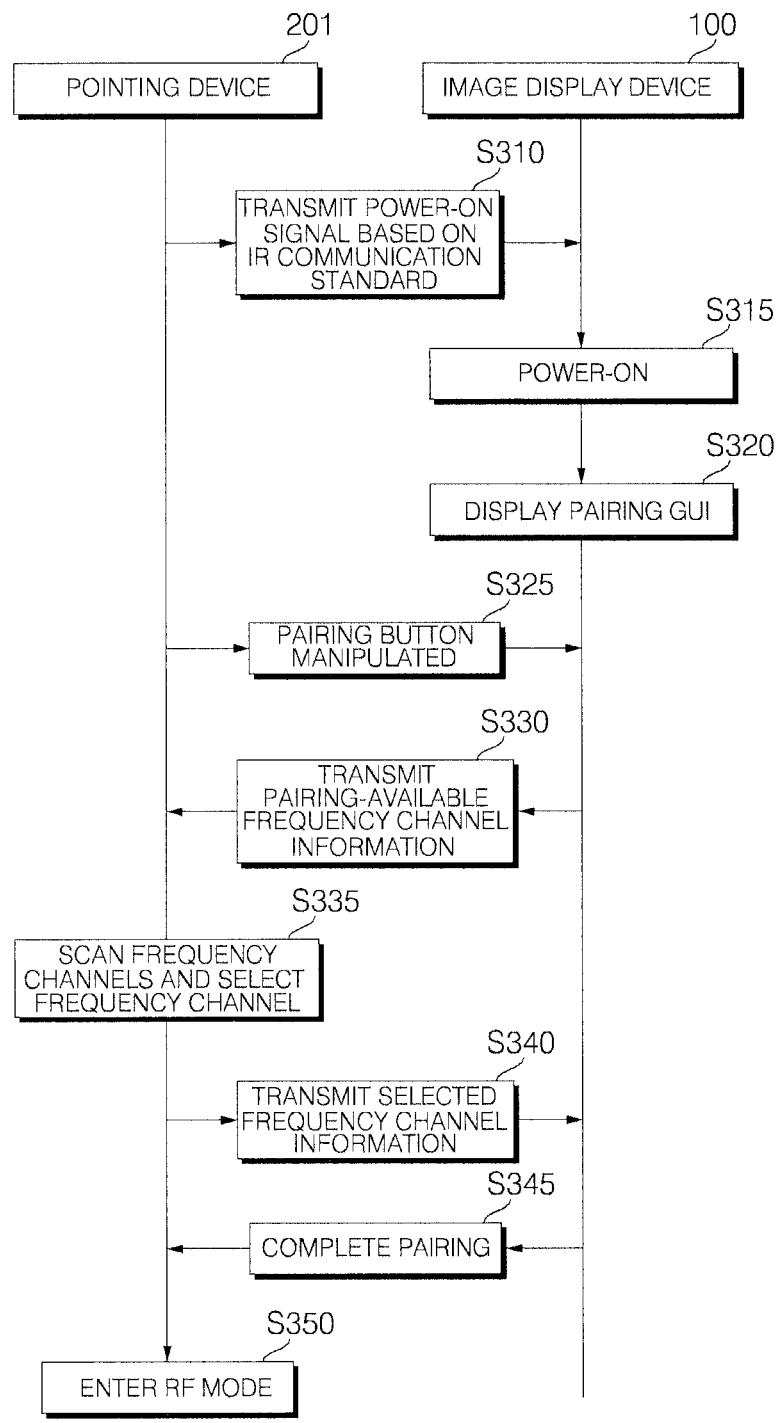
FIG. 10 is a flowchart illustrating a method for pairing an image display device according to an exemplary embodiment of the present invention.

FIG. 10 is a flowchart illustrating an operation method of the image display device according to an exemplary embodiment of the present invention. Other operations, orders of operations and embodiments may also be within the scope of the present invention.

The image display device 100 may be turned on by a power-on signal received from the 3D remote controller 201. The image display device 100 may provide a GUI by which the user may pair the 3D remote controller 201 with the image display device 100. The user may pair the 3D remote controller 201 with the image display device 100 as guided by the GUI.

As shown in FIG. 10, the user may transmit a power-on signal to the image display device 100 by manipulating the power-on button of the 3D remote controller 201 in operation S310. Upon sensing the user manipulation of the power-on button, the 3D remote controller 201 may transmit the power-on signal corresponding to the power-on button to the image display device 100 through the IR module 223 of the radio transceiver 220. The power-on signal may be an IR signal.

The image display device 100 may receive the power-on signal from the 3D remote controller 201 through the IR module 153 of the interface 150. The image display device 100 may be turned on in response to the power-on signal in operation S315. The power consumption of the IR modules 153 and 223 may be less than the power consumption of the RF modules 132 and 221. Thus, the image display device 100 may receive a signal through the IR module 153 and operate accordingly, even in a power-off state.

Upon power-on, the image display device 100 may display the GUI through which it may be paired with the 3D remote controller 201 on the display 170 in operation S320. The GUI may be displayed in graphics on the display 170 so as to allow the user to control the image display device 100. A pairing GUI may include a screen for guiding the user to pair the 3D remote controller 201 with the image display device 100.

The user may manipulate the 3D remote controller 201 as guided by the screen displayed in the image display device 100. When the user manipulates a pairing button of the 3D remote controller 201 as indicated in the GUI of the image display device 100, the 3D remote controller 201 may transmit a signal corresponding to the manipulated pairing button to the image display device 100 through the IR module 223 in operation S325.

The image display device 100 may determine from the received signal that the pairing button of the 3D remote controller 201 has been manipulated. In operation S330, the image display device 100 may transmit a signal carrying pairing-available frequency channel information to the 3D remote controller 201.

The image display device 100 may transmit information about RF frequency channel bands to the 3D remote controller 201. The RF frequency channel bands may be preferably at least 10 frequency channels that are available for pairing of the image display device 100.

The 3D remote controller 201 may scan frequency channels indicated by the pairing-available frequency channel information and select a frequency channel from among the scanned frequency channels in operation S335. The selected frequency channel may have a highest of the reception sensitivities of the scanned frequency channels or a least of the noise or interference of the scanned frequency channels. If the 3D remote controller 201 has been paired with another image display device, a frequency channel other than a pairing frequency channel of the other image display device may be selected as a pairing frequency channel for the image display device 100.

In operation S340, the 3D remote controller 201 may transmit information about the selected frequency channel to the image display device 100. The image display device 100 may establish a pairing frequency channel based on the selected frequency channel information in order to transmit and receive signals to and from the 3D remote controller 201 through the RF module 152 on the pairing frequency channel. The image display device 100 may transmit an ACK signal indicating completion of the pairing to the 3D remote controller 201 in operation S345.

Upon receipt of the ACK signal, the 3D remote controller 201 may enter the RF mode in operation S350. In the RF mode, the 3D remote controller 201 may transmit and receive signals to and from the image display device 100 based on the RF communication standard. For example, when the user manipulates a button or a key of the user input portion 230 of the 3D remote controller 201, the 3D remote controller 201 may transmit a signal corresponding to the manipulated button or key to the image display device 100 through the RF module 221. If the 3D remote controller 201 moves in a predetermined pattern, the remote controller 201 may transmit information about its movement sensed by the sensor portion 240 to the image display device 100 through the RF module 221.

The image display device 100 may receive a signal that the 3D remote controller 201 transmitted through the RF module 221, through the RF module 152 of the interface 150 and may operate in correspondence with the received signal. The image display device 100 may reply to the received signal with an ACK signal.

The 3D remote controller 201 may repeat transmission of the signal corresponding to the user-manipulated button or key until receiving the ACK signal. If the 3D remote controller 201 fails to receive the ACK signal despite a predetermined number of transmissions of the signal, the remote controller 201 may transmit the signal to the image display device 100 based on the IR communication standard.

Figure 11A:
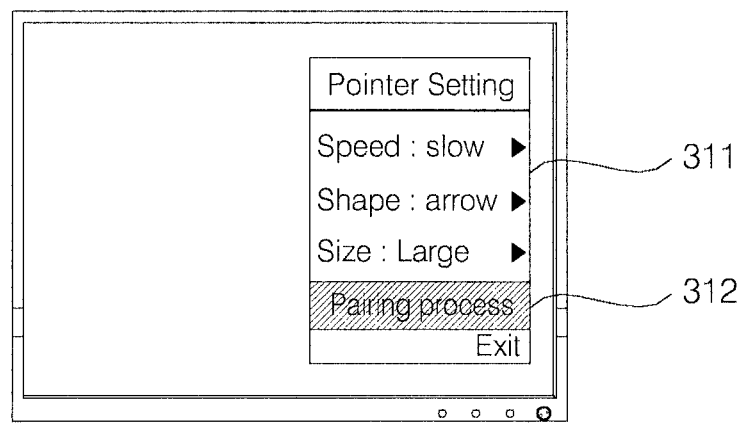
FIGS. 11A, 11B and 11C illustrate screens having images displayed on an image display device according to an exemplary embodiment of the present invention.
Figure 11B:
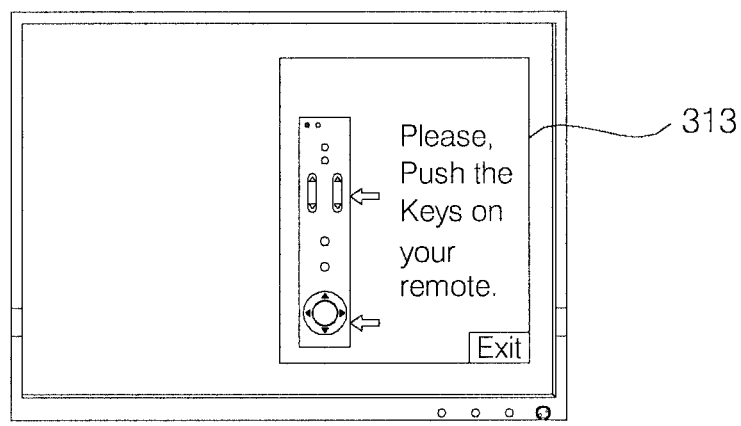
Figure 11C:
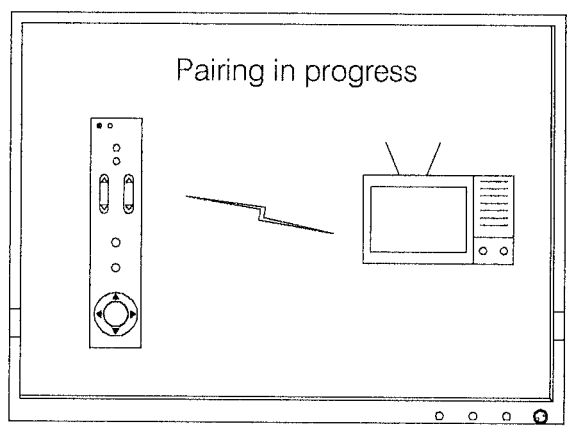

FIGS. 11A, 11B and 11C illustrate screens having images displayed on a display of an image display device according to exemplary embodiments of the present invention. Other operations, orders of operations and embodiments may also be within the scope of the present invention.

The image display device 100 may display a pairing GUI screen on the display 170 upon power-on. The pairing GUI screen may provide pairing-related information to the user. The user may set a pairing-related environment using the pairing GUI screen.

FIG. 11A illustrates a screen displayed on the display 170 of the turned-on image display device 100. The image display device 100 may display a pointer setting window 311 on the display 170 after the power-on in order to allow setting of properties of a pointer in relation to the 3D remote controller 201.

The user may set speed, shape, size, etc. of the pointer corresponding to the 3D remote controller 201 through the pointer setting window 311. In FIG. 11A, the user may select a pairing command entry item 312 by manipulating an up/down button of the 3D remote controller 201. Before pairing, the 3D remote controller 201 may transmit a signal corresponding to the up/down button manipulation to the image display device 100 based on the IR communication standard.

With the pairing command entry item 312 highlighted in the image display device 100, when the user manipulates an OK button of the 3D remote controller 201, the image display device 100 may display a pairing button guide window 313 on the display 170 in FIG. 11B.

The pairing button guide window 313 may provide information about a button by which to input a pairing command among buttons of the user input portion 230. The user may manipulate the pairing button as indicated by the pairing button guide window 313.

The user may input a pairing command to the image display device 100 by moving the 3D remote controller 201 in a predetermined pattern. The image display device 100 may provide information about the movement pattern of the 3D remote controller 201 corresponding to the pairing command by a pairing movement guide window.

Upon sensing manipulation of the pairing button, the 3D remote controller 201 may transmit a signal corresponding to manipulation of the pairing button to the image display device 100. Then the image display device 100 may start a frequency pairing process for transmitting pairing-available frequency channel information to the 3D remote controller 201.

When the pairing process starts, the image display device 100 may display on the display 170 a screen indicating a pairing in progress so that the user recognizes that pairing is in progress between the 3D remote controller 201 and the image display device 100, as shown in FIG. 11C.

Figure 12:
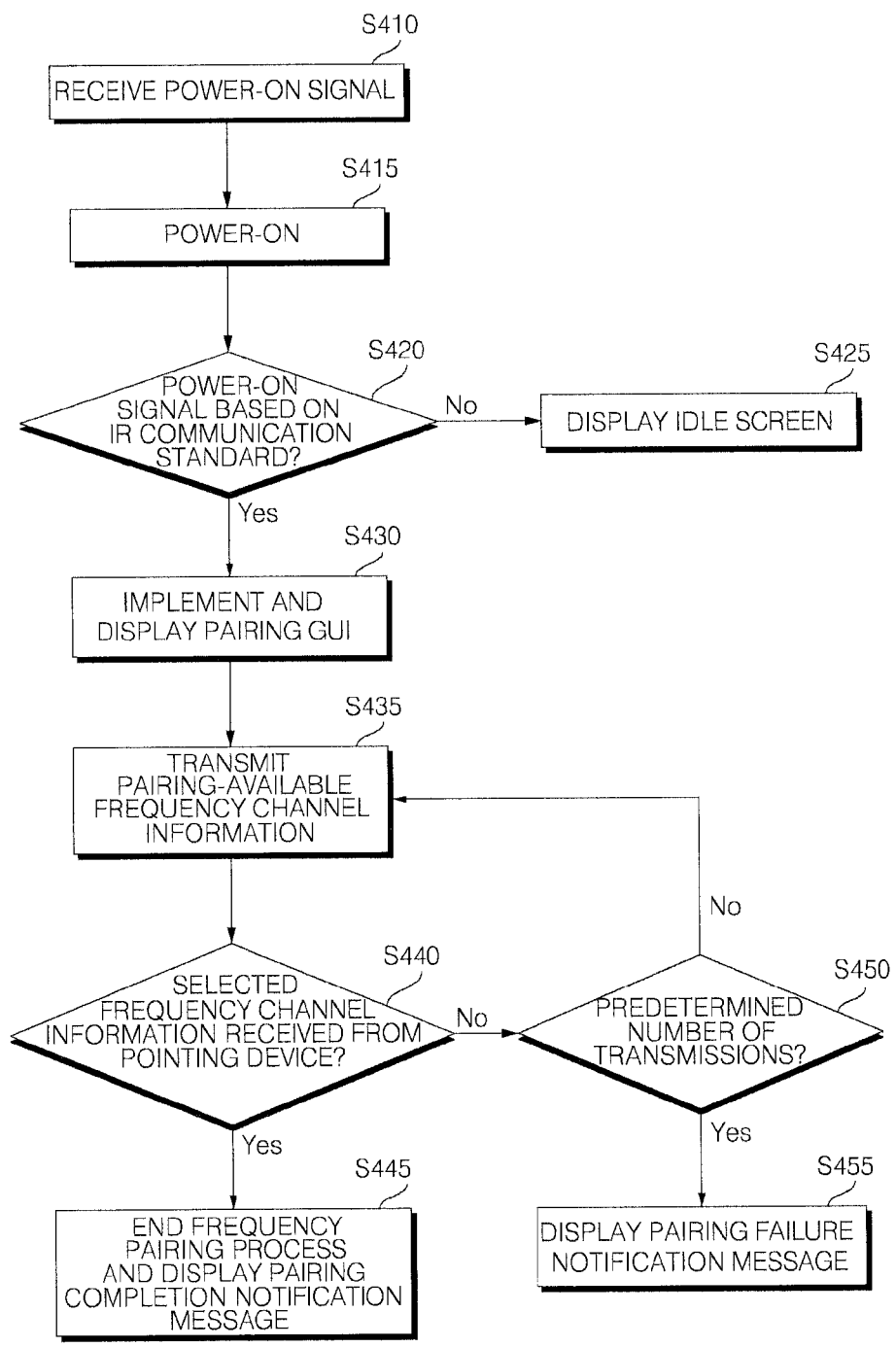
FIG. 12 is a flowchart illustrating a pairing method of an image display device according to an exemplary embodiment of the present invention.

FIG. 12 is a flowchart illustrating an operation method of an image display device according to an exemplary embodiment of the present invention. Other operations, orders of operations and embodiments may also be within the scope of the present invention.

After power-on, the image display device 100 may start a frequency pairing process with the 3D remote controller 201. The frequency pairing process may be described in more detail.

As shown in FIG. 12, the image display device 100 may receive a power-on signal in operation S410. The user may input the power-on signal to the image display device 100 by the power-on button of the user input portion 155 of the image display device 100 or the power on button for the image display device 100 located on the 3D remote controller 201. The user may provide the power-on signal to the image display device 100 by a remote control device such as the 3D remote controller 201, which may be a mobile communication terminal.

Upon receipt of the power-on signal, the image display device 100 may be turned on in operation S415. In operation S420, the image display device 100 may determine whether the power-on signal complies with the IR communication standard in operation S420. If the power-on signal is not based on the IR communication standard, the image display device 100 may determine that the power-on signal was from a remote control device paired with the image display device 100. In this case, the image display device 100 may display an idle screen on the display 170 without further performing the pairing process in operation S425.

If the power-on signal is in compliance with the IR communication standard, the image display device 100 may implement the pairing GUI and display it on the display 170 in operation S430. The 3D remote controller 201 may transmit the power-on signal through the IR module 223 before pairing is completed with the image display device 100. If the user uses two remote control devices, the user may transmit the power-on signal to the IR module 152 of the image display device 100 by a remote control device capable of IR communications with the image display device 100.

When the image display device 100 displays the pairing GUI on the display 170 and starts the frequency pairing process, the image display device transmits pairing-available frequency channel information to the 3D remote controller 201 in operation S435. The 3D remote controller 201 may select a frequency channel from among frequency channels indicated by the pairing-available frequency channel information as a pairing frequency channel and transmit information about the selected frequency channel to the image display device 100.

Upon receipt of a signal carrying the selected frequency channel information from the 3D remote controller 201 in operation S440, the image display device 100 may establish a pairing frequency channel based on the received information. The image display device 100 may display a message indicating pairing completion on the display 170 in operation S445.

On the other hand, when the image display device 100 fails to receive the signal carrying the selected frequency channel information from the 3D remote controller 201, the image display device 100 retransmits the pairing-available frequency channel information to the 3D remote controller 201 a predetermined number of times in operations S450 and S435. If the image display device 100 fails to receive the selected frequency channel information, it may display a pairing failure notification message on the display 170 in operation S455.

A remote control device may transmit a signal to an image display device based on an IR communication standard. The remote control device may transmit a command to the image display device before it is paired with the image display device. The image display device may be paired with the remote control device even when it is paired with another external device. The remote control device may also be paired with at least two image display devices. Therefore, the image display device capable of pairing with one or more external devices may be readily paired with the remote control device that can control one or more external devices.

Embodiments of the present invention may provide an image display device for readily pairing with a remote control device and an operation method thereof.

Embodiments of the present invention may provide an image display device for providing a Graphic User Interface (GUI) so that a user may easily pair a remote control device with the image display device.

Embodiments of the present invention may provide a method for pairing an image display device with a remote control device that can transmit commands to the image display device according to at least two communication standards.

Embodiments of the present invention may provide an image display device for pairing with a remote control device even when the image display device has already been paired with another external device or another remote control device, and an operation method thereof.

An operation method of an image display device may be provided that includes receiving a power-on signal based on an IR communication standard from a 3D remote controller, turning on according to the received power-on signal, transmitting pairing-available frequency channel information to the 3D remote controller, and establishing a pairing frequency channel for the 3D remote controller based on a signal received from the 3D remote controller in relation to the pairing-available frequency channel information.

An image display device may be provided that includes a radio transceiver for receiving a power-on signal based on an IR communication standard from a 3D remote controller, and a controller for, upon power-on of the image display device according to the received power-on signal, transmitting pairing-available frequency channel information to the 3D remote controller, and establishing a pairing frequency channel for the 3D remote controller based on a signal received from the 3D remote controller in relation to the pairing-available frequency channel information.

An operation method of an image display device may be provided that includes receiving a power-on signal according to an IR communication standard, turning on according to the received power-on signal, displaying a pairing GUI including a 3D remote controller pairing guide screen on a display, and pairing with a 3D remote controller when a user manipulates the 3D remote controller according to the pairing GUI.

An image display device may be provided that includes a display, a radio transceiver for receiving a power-on signal according to an IR communication standard, and a controller for upon power-on of the image display device according to the received power-on signal, displaying a pairing GUI including a 3D remote controller pairing guide screen on a display, and pairing the image display device with a 3D remote controller when the user manipulates the 3D remote controller according to the pairing GUI.

Exemplary embodiments of the present invention may also be embodied as processor-readable codes on a processor-readable recording medium provided in an image display device. The processor-readable recording medium may be any data storage device that can store data which can thereafter be read by a process. Examples of the processor-readable recording medium may include, but are not limited to, optical data storages such as ROM, RAM, CD-ROMs, magnetic tapes, floppy disks, optical data storage devices, and carrier waves (such as data transmission through the Internet via wired or wireless transmission paths). The processor-readable recording medium can also be distributed over network-coupled computer systems so that the processor-readable code is stored and executed in a distributed fashion.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of operating an image display device, comprising:
   receiving a power-on signal;
   displaying a Graphic User Interface (GUI) including a guide screen for pairing a remote controller with the image display device, wherein the guide screen provides information about a button to input a pairing command from among buttons of the remote controller;
   performing a pairing process between a remote controller and the image display device based on a pairing command;
   displaying a screen indicating a pairing in progress;

establishing a pairing between the remote controller and the image display device based on information provided in the guide screen of the GUI; and displaying a pointer based on a movement of the remote controller after establishing the pairing between the remote controller and the image display device.

2. The method according to claim 1, further comprising displaying a message indicating a pairing completion.

3. The method according to claim 1, wherein performing the pairing process comprises:

transmitting pairing-available frequency channel information to the remote controller, and receiving a selected frequency channel information of the remote controller.

4. An image display device comprising:

a display;

a radio signal transceiver for receiving a power-on signal; and a controller to control the display to display a Graphic User Interface (GUI) including a guide screen for pairing a remote controller with the image display device, to perform a pairing process between the remote controller and the image display device based on a pairing command, to control the display to display a screen indicating a pairing in progress, and to establish a pairing between the image display device and the remote controller based on information provided in the guide screen of the GUI, wherein the guide screen provides information about a button to input the pairing command from among a plurality of buttons of the remote controller, wherein the controller controls the display to display a pointer based on a movement of the remote controller after establishing the pairing between the remote controller and the image display device.

5. The image display device according to claim 4, wherein the controller controls the display to display a message indicating a pairing completion.

6. The image display device according to claim 4, wherein the radio signal transceiver transmits pairing-available frequency channel information to the remote controller, and receives a selected frequency channel information of the remote controller.

* * * * *